(12) United States Patent
Koenck et al.

(10) Patent No.: US 7,843,554 B2
(45) Date of Patent: Nov. 30, 2010

(54) HIGH DYNAMIC RANGE SENSOR SYSTEM AND METHOD

(75) Inventors: Steven E. Koenck, Cedar Rapids, IA (US); David W. Jensen, Marlon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 392 days.

(21) Appl. No.: 12/150,189

(22) Filed: Apr. 25, 2008

(65) Prior Publication Data

US 2009/0268192 A1 Oct. 29, 2009

(51) Int. Cl.
*G01C 3/08* (2006.01)

(52) U.S. Cl. ................................ 356/4.01; 356/5.01
(58) Field of Classification Search ............ 356/4.01, 356/5.01, 5.1; 342/89, 91, 94, 135, 205
See application file for complete search history.

(56) References Cited

U.S. PATENT DOCUMENTS

| | | | |
|---|---|---|---|
| 4,446,517 A | | 5/1984 | Katsura et al. |
| 4,891,559 A | * | 1/1990 | Matsumoto et al. ............ 315/82 |
| 5,260,936 A | | 11/1993 | Bardet et al. |
| 5,404,560 A | | 4/1995 | Lee et al. |
| 5,614,948 A | | 3/1997 | Hannah |
| 6,141,740 A | | 10/2000 | Mahalingaiah et al. |
| 6,369,737 B1 | | 4/2002 | Yang |

(Continued)

FOREIGN PATENT DOCUMENTS

WO WO 96/41231 12/1996

OTHER PUBLICATIONS

T. Nakamura and K. Saitoh, "Recent Progress in CMD Imaging"; 1997 IEEE Workshop on Charge-Coupled Devices and Advanced Image Sensors; pp. R14-1 through R14-4.

(Continued)

*Primary Examiner*—Isam Alsomiri
(74) *Attorney, Agent, or Firm*—Foley & Lardner LLP

(57) ABSTRACT

A high dynamic range sensor assembly includes a plurality of sensing sets that are organized into a sensing array. Each of the sensing sets includes a set of sensing elements for sensing physical phenomena. Each set of sensing elements has a locally selectable integration time. An analog-to-digital (A/D) converter operatively connected to the set of sensing elements acquires and converts an analog signal from each of the sensing elements into a digital signal. A processor operatively connected to the A/D converter and to the set of sensing elements manages the selectable integration time for the set of sensing elements and analyzes the digital signals from each of the sensing elements in the set of sensing elements. The digital signals from each of the sensing elements are measured by the processor and an integration scaling factor for the set of sensing elements is computed and controlled by the processor to adjust the integration time. The integration scaling factor for the set of sensing elements is mathematically combined with a value of the digital signal from the A/D converter to form a larger data word than what is generated by the A/D converter. The larger data word is utilized to represent a magnitude of each of the sensing elements. If a substantial number of A/D values have saturated, the integration time is decreased; and, if a substantial number of A/D values are below a predetermined threshold, the integration time is increased.

27 Claims, 8 Drawing Sheets

U.S. PATENT DOCUMENTS

| | | | |
|---|---|---|---|
| 6,538,593 | B2 | 3/2003 | Yang |
| 6,542,981 | B1 | 4/2003 | Zaidi et al. |
| 6,567,123 | B1 * | 5/2003 | Hashimoto ............... 348/229.1 |
| 6,606,704 | B1 | 8/2003 | Adiletta et al. |
| 6,738,884 | B1 | 5/2004 | Greicar |
| 6,836,288 | B1 | 12/2004 | Lewis |
| 2003/0110367 | A1 | 6/2003 | Chin et al. |
| 2003/0120874 | A1 | 6/2003 | Deshpande et al. |
| 2005/0097306 | A1 | 5/2005 | Gajski |
| 2006/0182145 | A1 | 8/2006 | Seo et al. |
| 2006/0251092 | A1 | 11/2006 | Matterne et al. |
| 2007/0038743 | A1 | 2/2007 | Hellhake et al. |
| 2010/0020199 | A1 * | 1/2010 | Meitav et al. .......... 348/231.99 |

OTHER PUBLICATIONS

Barton, J., et al., "InGaAs NIR focal plan arrays for imaging and DWDM applications," In: Proc. SPIE, 2002, vol. 4721, pp. 37-47, Aug. 5, 2002.

International Search Report and Written Opinion for International Application No. PCT/US2009/041111, mail date May 10, 2010, 6 pages.

Office Action for U.S. Appl. No. 11/805,510 (F&L Ref.: 047141-0600), mail date Mar. 9, 2010, 13 pages.

Office Action for U.S. Appl. No. 11/805,314 (F&L Ref.: 047141-0601), mail date Apr. 2, 2010, 18 pages.

Best et al., CMOS/SOS Microprocessor, MICRO An Advanced-Architecture Microprocessor, Aug. 1982 © 1982 IEEE Computer Society, The Institute of Electrical and Electronics Engineers, Inc., 18 pages.

Schleisiek, Klaus, MicroCore a Scalable, Dual Stack, Harvard Processor for Embedded Control that fits into FPGAs easily © Klaus Schleisiek, Apr. 16, 2004, Rev. 1.51, klaus.schleisiek@hamburg.de, 23 pages.

Intel iAPX 432 from Wikipedia®, Wikimedia Foundation, Inc., entry modified on Apr. 11, 2007 and printed on May 22, 2007 from http://en.wikipedia.org/wiki/Intel_iAPX_432, 5 pages.

U.S. Appl. No. 11/805,510, filed May 22, 2007, Koenck et al.

U.S. Appl. No. 11/805,314, filed May 22, 2007, Koenck et al.

U.S. Appl. No. 11/805,571, filed May 22, 2007, Koenck et al.

MicroCore Home Page, This site is the home of the "MicroCore" Project, believed to be available by Jun. 24, 2004, printed from http://www.microcore.org on Sep. 8, 2009, 2 pages.

MicroCore implementation and modularisation, Jun. 24, 2004, printed from website http://www.microcore.org, 6 pages.

Schleisiek, Klaus, "MicroCore, a scalable, dual Stack, Harvard Processor for embedded Control that fits into FPGAs easily," Apr. 16, 2004, printed from website http://www.microcore.org, 23 pages.

Schleisiek, Klaus, "Using MicroCore, Report on a Deeply Satisfying Instantiation," 20th euroForth Conference, Saarland, Germany, Nov. 19-22, 2004, 11 pages.

US Office Action for U.S. Appl. No. 11/805,314 mailed Sep. 24, 2009, 20 pages.

* cited by examiner

Full Integration

1/2 Integration

Full Integration

1/16 Integration

1/1024 Integration

HIGH DYNAMIC RANGE SENSOR SYSTEM AND METHOD

BACKGROUND OF THE INVENTION

1. Field of the Invention

The present invention relates generally to sensing of physical phenomena, particularly to optical image sensing, and more particularly to high dynamic range optical imaging for digital electronic night vision.

2. Description of the Related Art

Night vision capability provides warfighters a significant force multiplication benefit. Military operations are increasingly being conducted in urban terrain, which is much more demanding of dynamic range than traditional rural venues. In particular, soldiers conducting military operations during night in urban terrain may encounter light conditions ranging from "overcast starlight" to relatively bright artificial lighting. The dynamic range within a single scene may vary by 6 or 7 orders of magnitude or more, ranging from street lights (approximately 10 lux) to dark alleys (approximately 1 microlux). Present night vision systems use a single user adjustable exposure control to set a nominal range for present light conditions with a dynamic range that is generally limited to about 16 bits of sample resolution. What is needed is an ability to automatically capture a wider range of night vision scene information including dark areas within relatively bright scenes that can then be intensity scaled and represented to a soldier on a display.

Referring now to FIG. 1, a simplified schematic of a basic digital night vision pixel is illustrated, designated generally as 2. The digital night vision pixel 2 includes a sensor 3 that senses physical phenomena such as light. A typical light sensor is a P-N junction that generates photocurrent in proportion to the intensity of the light that impinges on the P-N junction. The sensor 3 is connected to a storage capacitor 4 that accumulates photocurrent generated by sensor 3 through an integration switch 5. The integration switch 5 controls an integration time of the sensor 3 which determines the effective sensitivity of the sensor 3. A reset switch 6 is connected to the storage capacitor 4 in parallel. The reset switch 6 is used to reset the sensor 3 to a state corresponding to no charge. A multiplexer (Mux) switch 7 connects the integration switch 5 to a shared A/D converter 8 that converts the analog signal to a digital signal. The resolution of the A/D converter 8 determines the dynamic range within a scene. A 16 bit A/D converter is about the limit; however, 20 or more bit resolution is needed for the previously described urban terrain application.

One prior art attempt to extend the dynamic range of an optical sensor is described by Tsutomu Nakamura and Kuniaki Saitoh in a paper entitled "Recent Progress in CMD Imaging" presented at the 1997 IEEE Workshop on Charge-Coupled Devices and Advanced Image Sensors. This paper describes a mode of operation of an image sensor whereby the sensor is scanned twice per field. The first scan outputs a signal with a short integration time in non-destructive readout mode; the second scan outputs a signal with a long integration time. The two signals are combined to generate an image with higher dynamic range. A disadvantage of this approach is that an entire scan of the field for each different integration time is needed, which limits the potential dynamic range that may be achieved. A further disadvantage of this approach is the potential for image degradation due to changes and movements in the scene between scans.

Another attempt to extend the dynamic range of an optical image sensor is described in U.S. Pat. No. 6,369,737, issued to Yang et al, entitled "Method and Apparatus for Converting a Low Dynamic Range Signal to a Large Dynamic Range Floating-Point Digital Representation". Yang et al disclose an optical image sensing apparatus with a sub-converting A/D converter embedded in the image sensing array to provide a digital sample word wider than the resolution of the A/D converter. The resolution of the rather limited subconverting A/D is only moderately extended by that approach.

Yet another prior art attempt to extend the dynamic range of an optical image sensor is described in U.S. Pat. No. 5,614,948 issued to Hannah, entitled "Camera Having an Adaptive Gain Control". In the Hannah device, the gain of an output amplifier is varied over different regions of the imaging array as indicated by the row and column addresses of the array. While this approach can reduce the range of signal excursions on the analog output path, it has no effect on the dynamic range of the sensing element of the array.

What is needed is an optical image sensor with the ability to sense and capture images of a single scene with light intensity conditions varying by 20 bits or more. What is further needed is a high dynamic range optical image sensor that is capable of rapidly capturing an indefinitely long series of images of scenes, each with light intensity conditions varying by 20 bits or more.

SUMMARY OF THE INVENTION

In a broad aspect, the present invention is a high dynamic range sensor assembly that includes a plurality of sensing sets that are organized into a sensing array. Each of the sensing sets includes a set of sensing elements for sensing physical phenomena. Each set of sensing elements has a locally selectable integration time. An analog-to-digital (A/D) converter operatively connected to the set of sensing elements acquires and converts an analog signal from each of the sensing elements into a digital signal. A processor operatively connected to the A/D converter and to the set of sensing elements manages the selectable integration time for the set of sensing elements and analyzes the digital signals from each of the sensing elements in the set of sensing elements. The digital signals from each of the sensing elements are measured by the processor and an integration scaling factor for the set of sensing elements is computed and controlled by the processor to adjust the integration time. The integration scaling factor for the set of sensing elements is mathematically combined with a value of the digital signal from the A/D converter to form a larger data word than is generated by the A/D converter. The larger data word is utilized to represent a magnitude of each of the sensing elements. If a substantial number of A/D values have saturated, the integration time is decreased; and, if a substantial number of A/D values are below a predetermined threshold, the integration time is increased.

A significant disadvantage of the concept presented by Nakamura and Saitoh is the requirement for multiple sequential scans of a scene, which results in image degradation and limits the potential dynamic range extension. The present invention overcomes this disadvantage by capturing a scene in a single scan with significantly extended dynamic range.

Unlike the device disclosed in Yang et al, the present invention teaches an improved optical image sensor utilizing novel local shuttering whereby an imaging array is comprised of a plurality of clusters of conventional pixels, each of which is operatively connected to a miniature programmed microcore processor dedicated to processing the signals received from the pixels in its associated cluster. Rather than performing a sub-converted analog to digital conversion with a scaling factor in a single frame capture period, the high dynamic range sensor of the present invention captures each frame using a previously determined integration time selected for each cluster of pixels, inputs the sensed light intensity values sensed from each pixel, and determines from the magnitude of those sensed light intensity values what the new integration time for each cluster of pixels should be in the subsequent frame capture period. A further disadvantage of the device disclosed by Yang et al is the complexity and amount of microelectronic circuitry required to be placed near the sensor, which decreases the so-called "fill factor," which is defined as the percentage of the pixel area that is responsive to light.

Unlike the system disclosed by Hannah, the present invention is directed toward increased dynamic range at the point of the sensing elements of the imaging array. The signals from these sensing elements are directed to a standard output structure including an A/D converter with fixed resolution.

Although the present invention is especially beneficial for electronic night vision, the principles herein can dramatically improve the performance of numerous wide dynamic range optical imaging systems. For example, the principles herein can be extended to a combined day or night vision system with an appropriately configured optical sensor capable of operation in either high or low light conditions. In such a system, the high dynamic range provided by the present invention would be particularly valuable.

Furthermore, although the principles herein are presently contemplated for optical imaging applications, these concepts could be applied to any sensing problem, particularly to array sensing applications such as acoustic, sonar, radar, seismic sensing and the like.

DETAILED DESCRIPTION OF THE INVENTION

Figure 2:
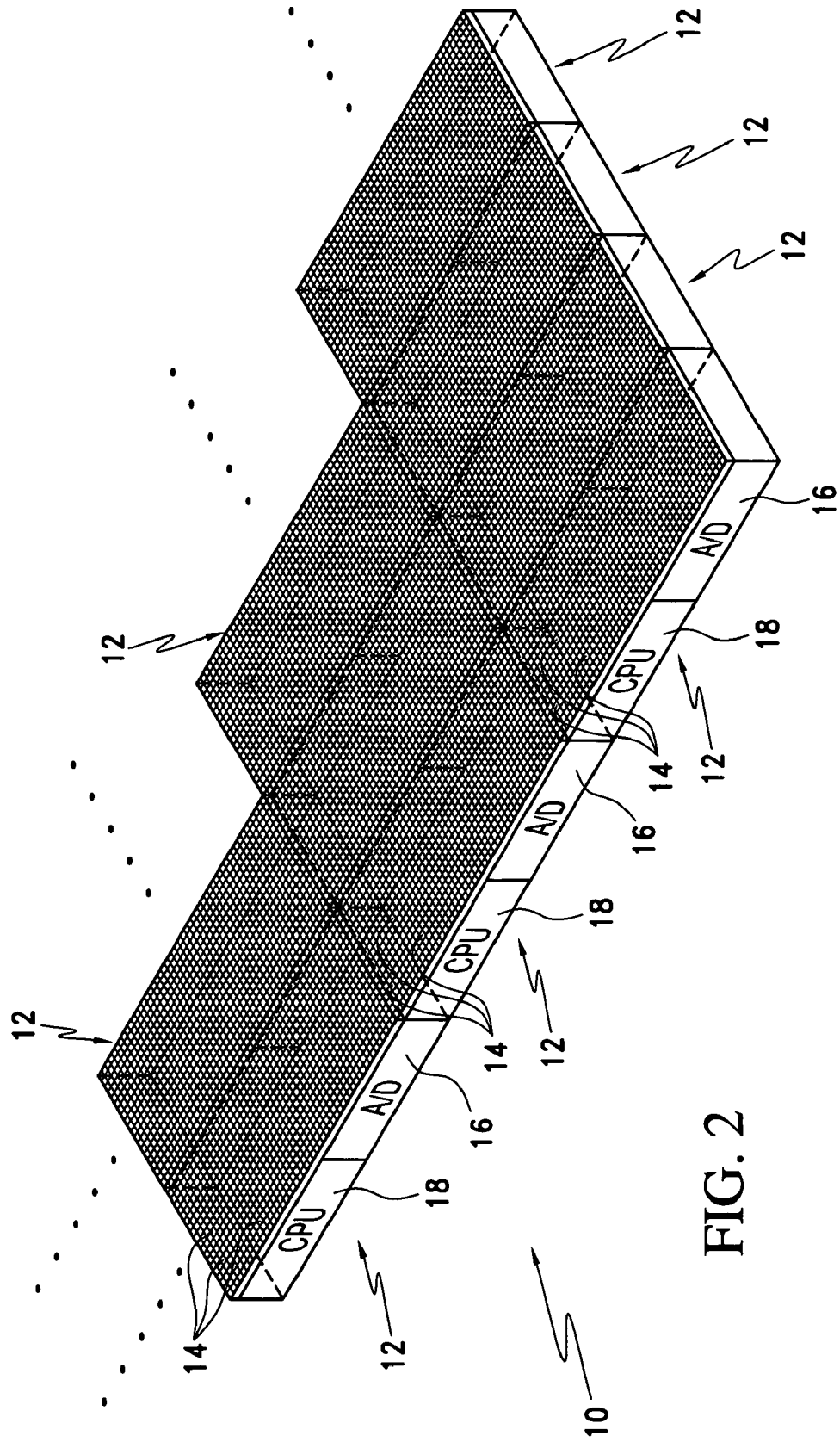
FIG. 2 is a schematic illustration of the high dynamic range sensor assembly of the present invention.

Referring now to FIG. 2, a schematic representation of a high dynamic range sensor assembly of the present invention is illustrated, designated generally as 10. The high dynamic range sensor assembly 10 comprises multiple pixel sets (i.e. "sensing sets" or "clusters"), each designated generally as 12 that are organized into a sensing array. Each pixel set includes a set of sensing elements 14 for sensing physical phenomena. The set of sensing elements 14 have a locally selectable integration time. An analog-to-digital (A/D) converter 16 is operatively connected to the set of sensing elements 14 for acquisition and conversion of an analog signal of each of the sensing elements 14 into a digital signal. A processor 18 is operatively connected to the A/D converter 16 and to the set of sensing elements 14 for managing the selectable integration time for the set of sensing elements 14 and for analyzing the digital signals from each of the sensing elements 14 in the set of sensing elements. The digital signal from each of the sensing elements is measured by the processor 18. An integration scaling factor for the set of sensing elements 14 is computed and controlled by the processor 18 to adjust the integration time. The resolution of the A/D converter is M bits, where M is an integer and $M>0$.

The processor 18 is preferably a microcore type of processor that provides fast performance with a small physical size and low power consumption. It is essential that the processor 18 be of a physical size and power consumption range that is consistent with the requirements of a portable, battery powered digital night vision system. In an exemplary embodiment, a digital night vision system may have a resolution of 1536×1280 pixels comprised of 12 columns of clusters of pixels 12 in the horizontal dimension and 10 columns of clusters in the vertical dimension. According to an aspect of the present invention, each of the 120 clusters of pixels 12 has an associated processor 18, for a total of 120 processors in the system. For battery powered portable operation, it is desirable for the total power consumption of a system to be on the order of about 1 watt or less. If about half of the total system power consumption of 1 watt is allocated to the 120 instances of processor 18, each processor should preferably consume less than about 4 milliwatts. A preferred microcore processor that is consistent with this power consumption characteristic is disclosed and claimed in present co-applicant Koenck's co-pending U.S. patent application Ser. No 11/805,510, filed on May 22, 2007, entitled "Energy Efficient Processing Device", which is incorporated herein in its entirety. A related micro-architectural approach for a network microprocessor with low power consumption is disclosed and claimed in present co-applicant Koenck's co-pending U.S. patent application Ser. No. 11/805,571, filed on May 22, 2007, entitled "Improved Mobile Nodal Based Communication System, Method and Apparatus", which is also incorporated herein in its entirety.

In the exemplary embodiment shown in FIG. 2, the connections between the sensing elements 14 with their associated analog interface 28 (see FIG. 3) to the A/D converter 16 and processor 18 may be made by a vertical through-wafer via connection, whereby a small hole is fabricated by an appropriate semiconductor process to create an electrical interface from the front side of the semiconductor device to the back side. In an alternate embodiment (not shown), the connections between the sensing elements 14 with their associated analog interface 28 may be made by a lateral connection, whereby instead of locating the A/D converter 16 and processor 18 vertically below each cluster of pixels 12, the A/D converter 16 and processor 18 for each cluster of pixels 12 are located at the edges of the image sensing array comprised of a plurality of clusters of pixels 12, and laterally disposed conductors provide the electrical interface. In either embodiment, connections between adjacent processors 18 may be provided to enable communication of image information between processors for purposes of image acquisition analysis, image processing, or output of image information to external utilization devices or systems.

Figure 3:
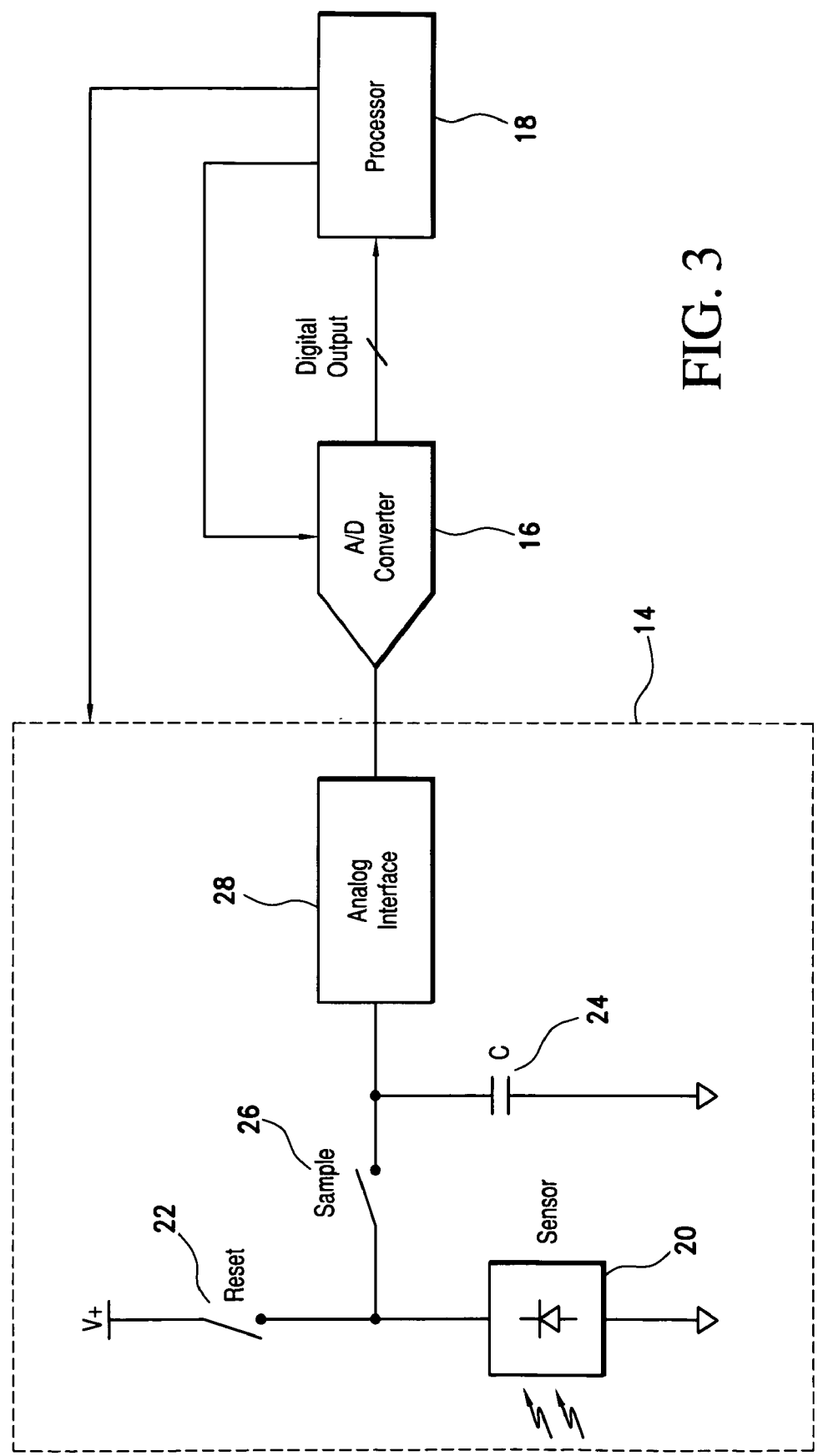
FIG. 3 is a schematic illustration of a sensing element of the sensor assembly of the present invention.

Referring now to FIG. 3, a schematic representation of a sensing element 14 of the present invention is illustrated. The sensing element 14 comprises: a sensor 20 that senses physical phenomena such as light on the sensor 20 P-N junction; a reset switch 22 that resets the sensor 20 to an initial state that has no signal; a capacitor 24 that stores charged voltage from the sensor 20; a sample switch 26 that enables photocurrent from the sensor 20 P-N junction to accumulate in the storage capacitor 26; and an analog interface 28 that connects storage capacitor 24 to a shared A/D converter 16. The A/D converter 16 connects to a processor 18 that controls the reset switch 22, the sample switch 26 and the analog interface 28.

Figure 1:
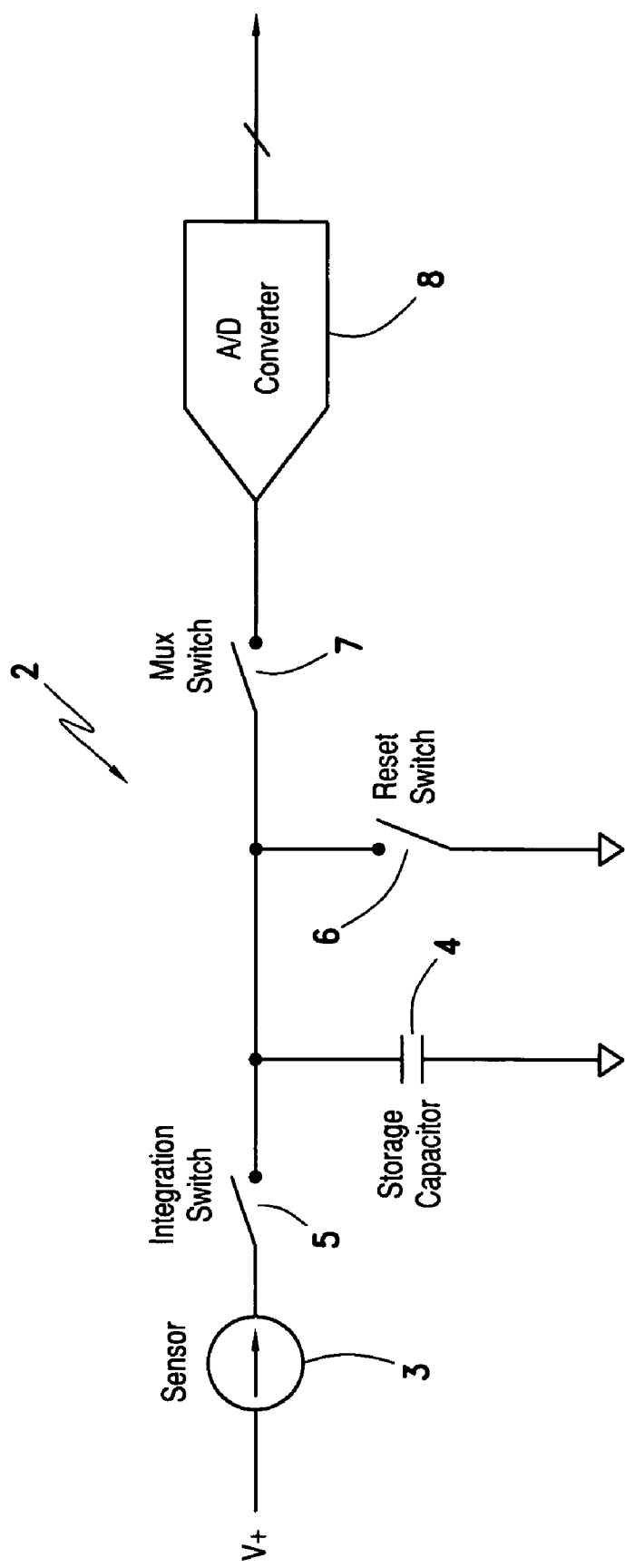
FIG. 1 (Prior Art) is a schematic illustration of a conventional night vision sensor.

The high dynamic range sensor of the present invention concept utilizes the structure of the prior art shown in FIG. 1 with the addition of a control on the sample switch that gates this switch with a processor controlled duty factor. In maximum sensitivity made, the duty factor is 100%, and the pixel operates in a similar manner to the prior art sensor schematically described in FIG. 1. In reduced sensitivity mode, the duty factor is reduced by a predetermined scaling factor. In an exemplary embodiment, the duty factor is reduced in steps of ½, which respectively doubles the gain scaling factor of that pixel (and every other one in that cluster). The same exact number of bits of resolution are read out of the A/D converter, but each ½ scaling factor (=2×gain) causes the absolute signal (voltage) digital representation to be shifted left by one bit position.

The integration scaling factor for the set of sensing elements 14 is mathematically combined with a value of the digital sample word from the A/D converter 16 to form a larger data word than what is generated by the A-D converter 16. The larger data word is utilized to represent a magnitude of each of the sensing elements 14 in the cluster of pixels 12. In an exemplary embodiment, scaling factors that are multiples of $½^N$ may be conveniently mathematically combined with the value of the digital sample word by simple logical shift operations, whereby a shift of the A/D sample by one position to the left represents a mathematical multiplication by 2.

Alternate embodiments of scaling factors and mathematical combination processes may be employed to form a larger data word than what is generated by the A/D converter 16. In a first alternate embodiment, for example, the scaling factor may be of a type with a ratiometric relationship of integers of the type I/J. The mathematical combination process in this case consists of multiplication of the digital sample by the value of J/I. Multiplication of the digital sample by the integer J may be accomplished by an integer multiplication operation. I may be chosen to be a factor of $2^N$ to simplify the implementation of the mathematical division operation to a simple logical shift right rather than the more complex general integer division operation. In a second alternate embodiment, the scaling factor may be a nonlinear mathematical function such as a logarithmic, exponential or other function. The mathematical combination process in this case consists of multiplication of the digital sample by the reciprocal of the nonlinear mathematical function. Implementation of this mathematical combination process may utilize any of several well known techniques including software executing on the processor 18, a look-up table (not shown), or a combination thereof.

The processor 18 reads the fixed length A/D sample (e.g. 10 bits) and combines this value with its knowledge of the duty factor scaling. For example, if the integration duty factor is 100% then the A/D converter 16 samples will be at maximum sensitivity and will be shifted to the rightmost position. In an exemplary embodiment, if the integration duty factor is 6.25% (1/16), the A/D samples will be shifted left by four bit positions and the rightmost four bits will be filled with zeros, which performs a mathematical multiplication by 16. A/D samples shifted completely to the left represent the minimum sensitivity (highest light) mode.

The integration scaling factor for the set of sensing elements 14 is computed by the processor 18 by analyzing the digital sample word from the A/D converter 16. If a substantial number of A/D values from sensing elements 14 have saturated, the integration time is decreased; and, if a substantial number of A/D values from sensing elements 14 are below a predetermined threshold, the integration time is increased. As the A/D values are read out of the array, the processor 18 can examine the range of values that are captured. In an exemplary embodiment, with a full set of $½^N$ prescaling duty factors (e.g. 1/1, ½, ¼, ⅛, . . . 1/16384) the ideal range of A/D samples would go up to above the 50% full scale range (FSR) and presumably down to some fairly low level. If no sample is above a predetermined threshold, i.e. 50% FSR, the integration time is too short and too little signal has been captured. If substantial numbers of samples are at 100% FSR, the sensor has saturated and the integration time was too long. Analysis of the samples is a well known histogram process that can be implemented effectively by the programmed processor 18.

The resulting behavior of this high dynamic range sensor is as follows: An initial estimate at the proper (or best guess) integration duty factor is set for each of the plurality of sets of pixels. A full frame scene acquisition is executed at the normal frame rate (e.g. 60 Hz.→16.7 milliseconds). The samples from each pixel are read out of each set of pixels by its processor. For each set of pixels, if too many samples are less than 50% FSR, the integration time is increased. If too many samples are at 100% FSR, the integration time is decreased. With newly set integration times loaded into the set of pixels integration controls, a new frame scene acquisition is executed and the process continues.

A considered disadvantage of this approach is that it may take several frames to get all of the sets of pixels to their optimum integration duty factor. If there are 14 prescaling factors, an initial "guess" could be in the middle ($½^7=1/128$) and up to 7 frames would be sampled to have the full 1/1 to 1/16384 range. At a 60 Hz. frame capture rate, this time is 117 milliseconds, which still is not deleterious.

Figure 4:
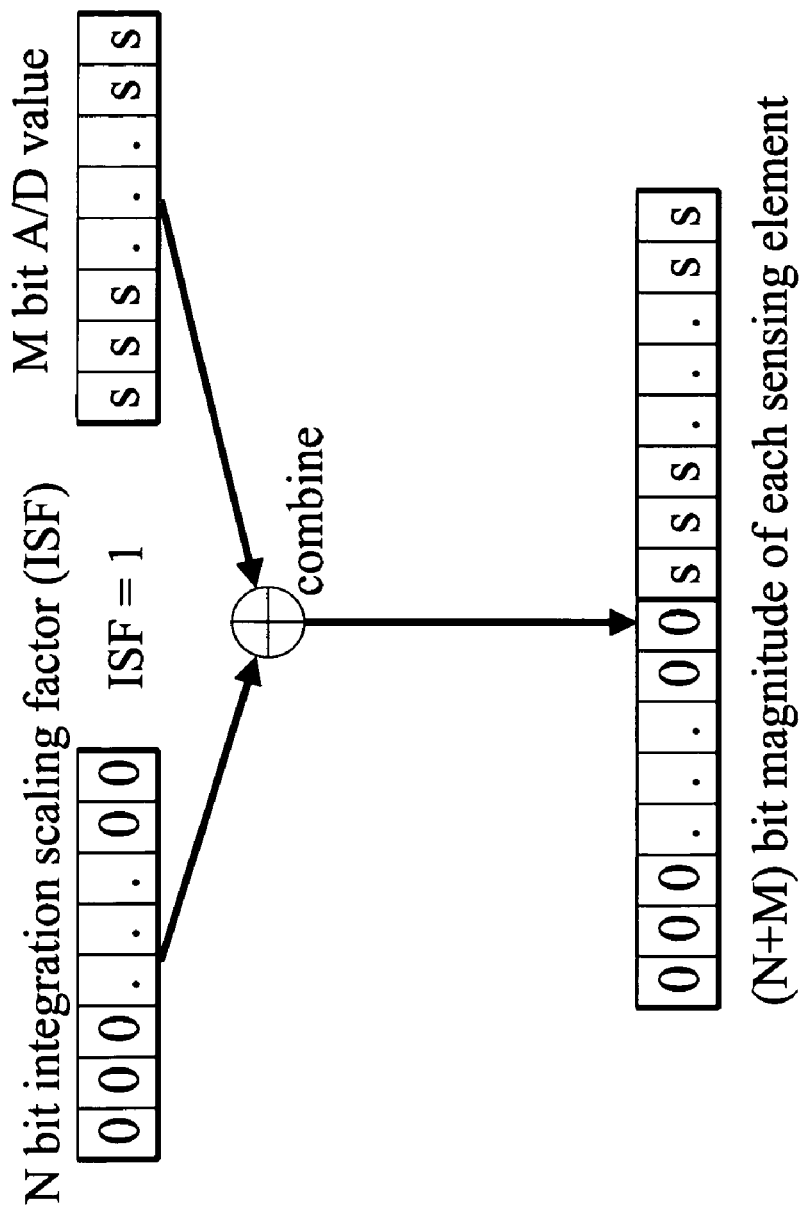
FIG. 4 is a schematic illustration showing the combining of a value of an A/D converter and an integration scaling factor (ISF) to form a larger data word to represent the signal magnitude of each pixel in a set of sensing elements.

Referring now to FIG. 4, a schematic diagram of the combining of an N bit integration scaling factor (ISF) and an M bit digital value from the A/D converter 16 to form a (N+M) bit data word is illustrated. The (N+M) bit data word represents a magnitude of a pixel in a set of sensing elements 14. When ISF=1, the N bit integration scaling factor is filled with zeros. The N most significant bits of the (N+M) bit data word are zero and the M least significant bits of the (N+M) bit data word are filled with M bit digital value from the A/D converter 16. This is a full integration scenario.

Figure 5:
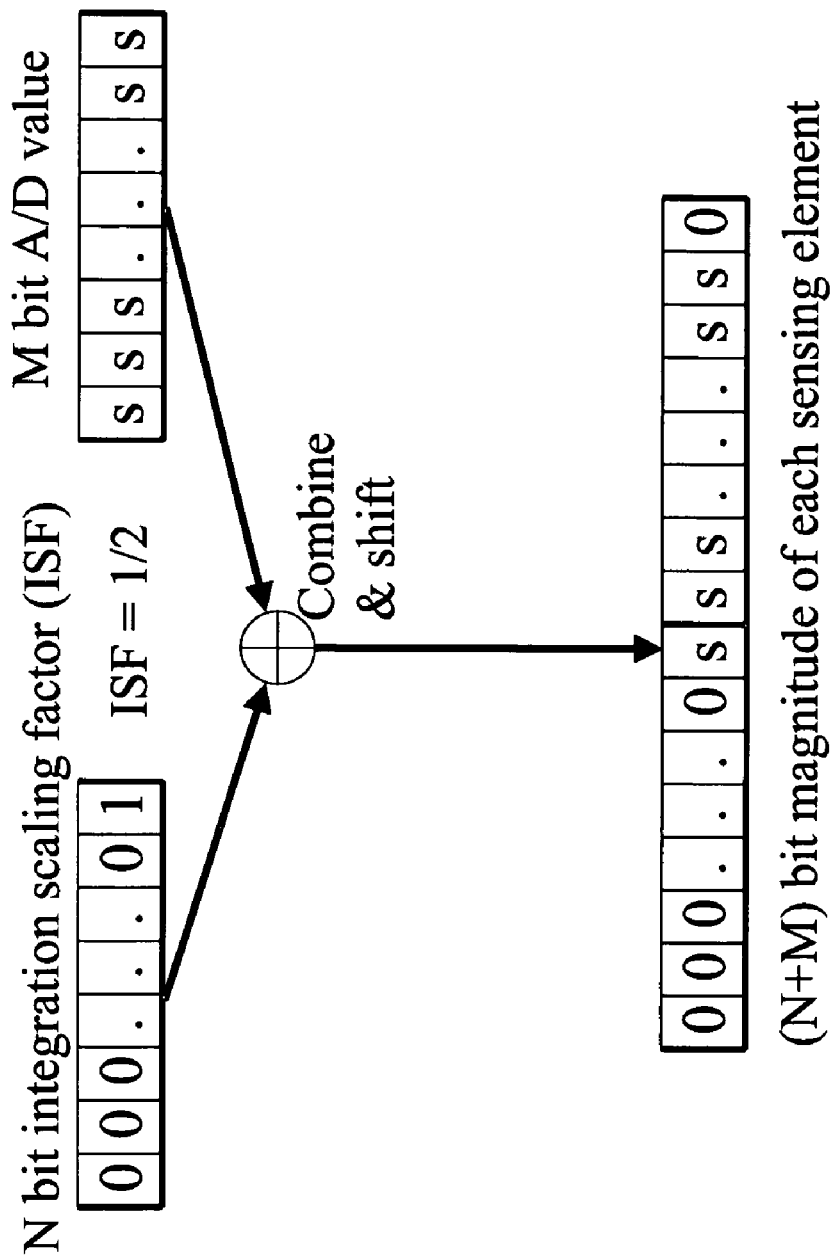
FIG. 5 is a schematic illustration showing the combining of a value of an A/D converter and an integration scaling factor (ISF) to form a larger data word to represent a magnitude of a pixel in a set of sensing elements and to shift the larger data word left one bit, where $ISF=\frac{1}{2}$.

Referring now to FIG. 5, a schematic diagram of the combining of an N bit integration scaling factor (ISF) and M bit digital value from the A/D converter 16 to form a (N+M) bit data word, where ISF=½, is illustrated. When ISF=½, the N bit integration scaling factor is filled with zeros except that the least significant bit which is filled with one. The resulting magnitude is a (N+M) bit data word with the leading (N−1) bit most significant bits filled with zeros, the least significant bit filled with zero, and the M bits in the middle filled with an M bit digital value from the A/D converter 16.

The integration scaling factor for the set of sensing elements 14 is selected from a data set $\{1/2^{(N-1)}, \ldots 1/8, 1/4, 1/2, 1\}$, the data set containing N items, where N is an integer and N>=1.

Figure 6:
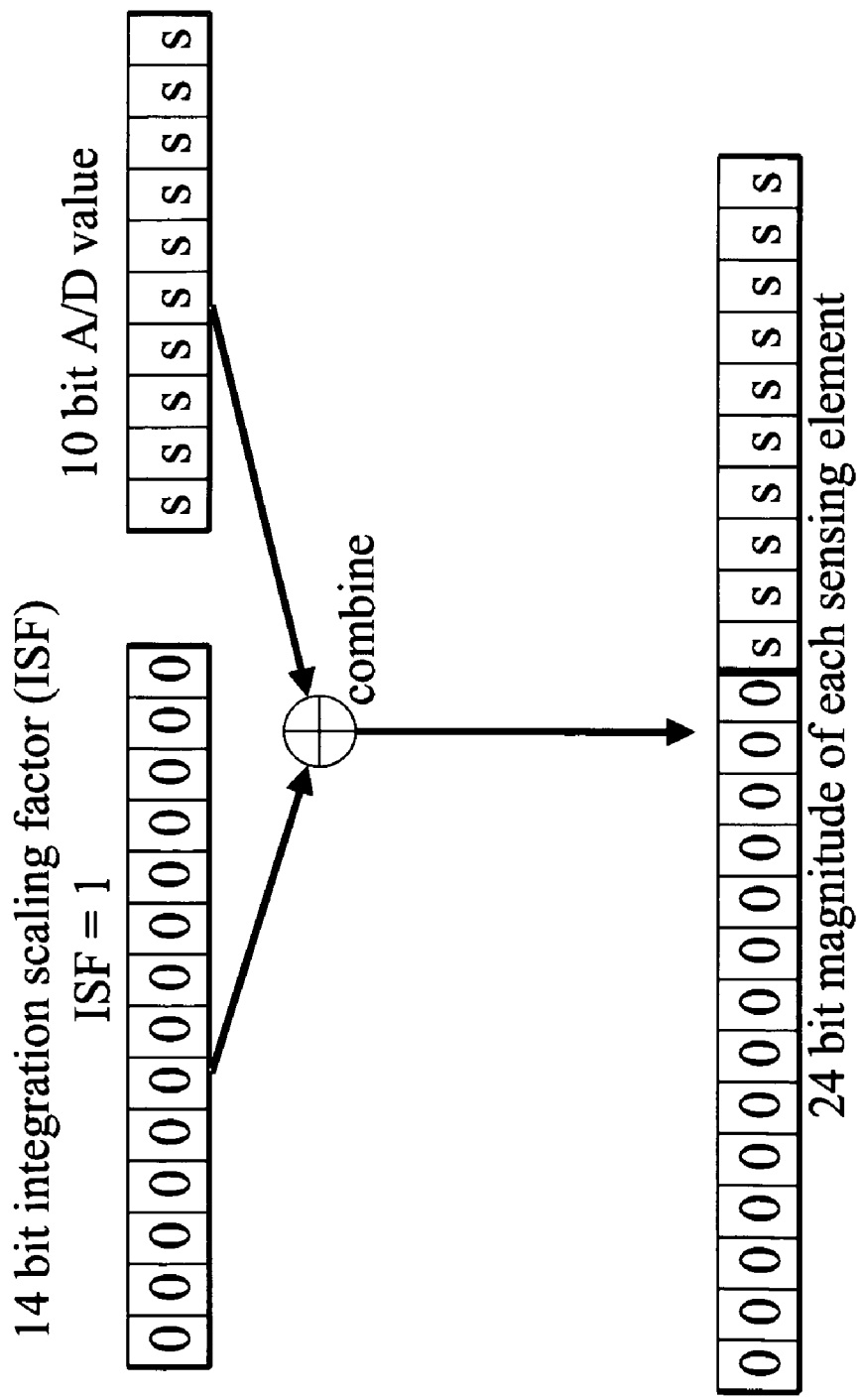
FIG. 6 is a schematic illustration showing the combining of a value of a 10 bit A/D converter and a 14 bit integration scaling factor (ISF) to form a 24 bit word to represent a magnitude of a pixel in a set of sensing elements, where $ISF=1$.

Referring now to FIG. 6, a schematic diagram of the combining of a 14 bit integration scaling factor (ISF) and 10 bit digital value from an A/D converter to form a 24 bit data word, where ISF=1, is illustrated. The 24 bit data word represents a magnitude of a pixel in a set of sensing elements 14. When ISF=1, 14 the bit integration scaling factor is filled with zeros. The 14 most significant bits of the 24 bit data word are zero and the 10 least significant bits of the 24 bit data word are filled with a 10 bit digital value from the A/D converter. This is a full integration scenario.

Figure 7:
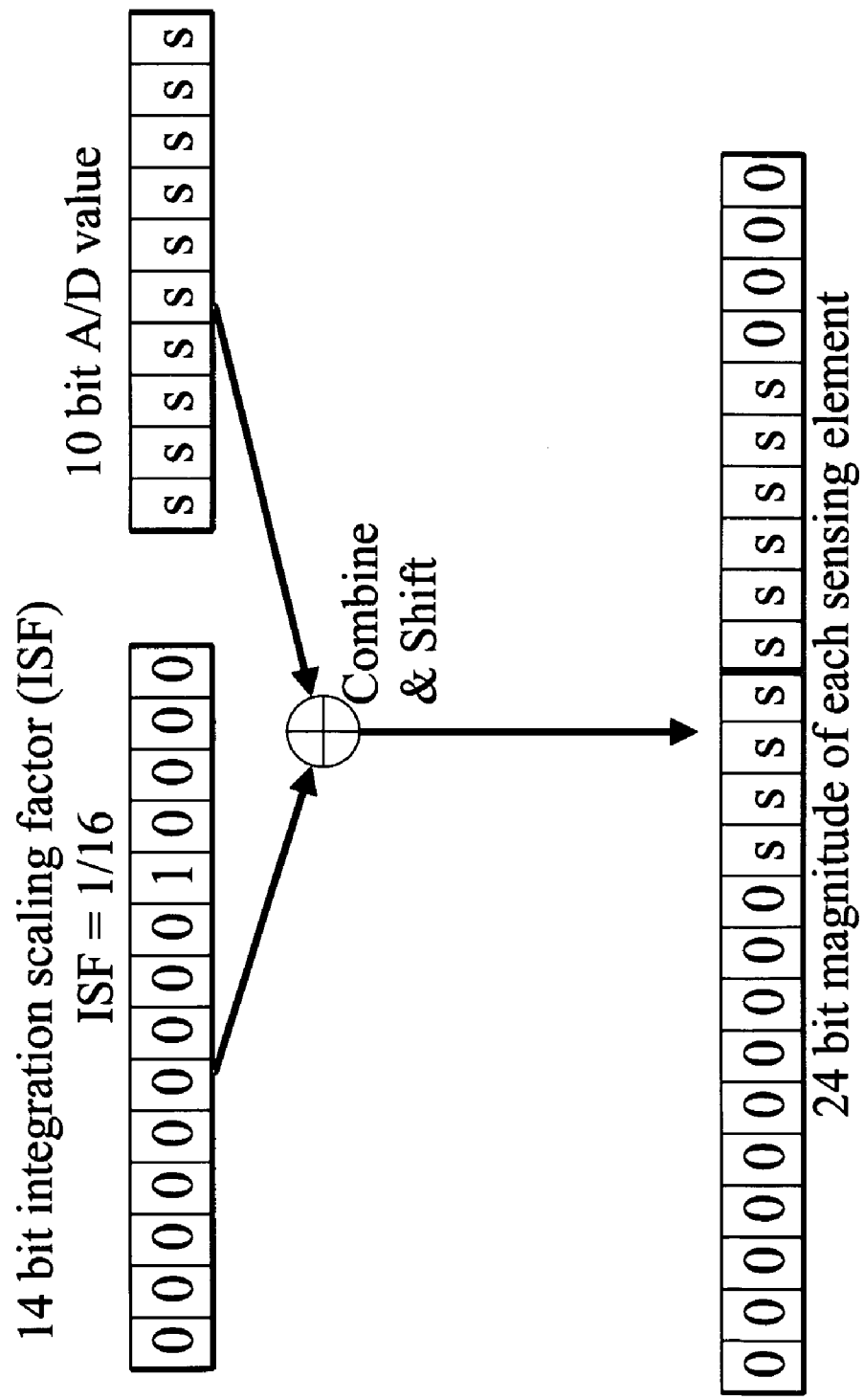
FIG. 7 is a schematic illustration showing the combining of a value of a 10 bit A/D converter and a 14 bit integration scaling factor (ISF) to form a 24 bit word to represent a magnitude of a pixel in a set of sensing elements and to shift the 24 bit word to left 4 bits, where $ISF=\frac{1}{16}$.

Referring now to FIG. 7, a schematic diagram of the combining of a 14 bit integration scaling factor (ISF) and 10 bit digital value from an A/D converter to form a 24 bit data word, where ISF=1/16, is illustrated. When ISF=1/16, the 14 bit integration scaling factor is filled with zeros except that the fifth least significant bit is filled with one. The resulting magnitude is a 24 bit data word with the leading 10 bit most significant bits filled with zeros, the 4 least significant bits filled with zeros, and the 10 bits in the middle filled with 10 bit digital value from the A/D converter.

Figure 8:
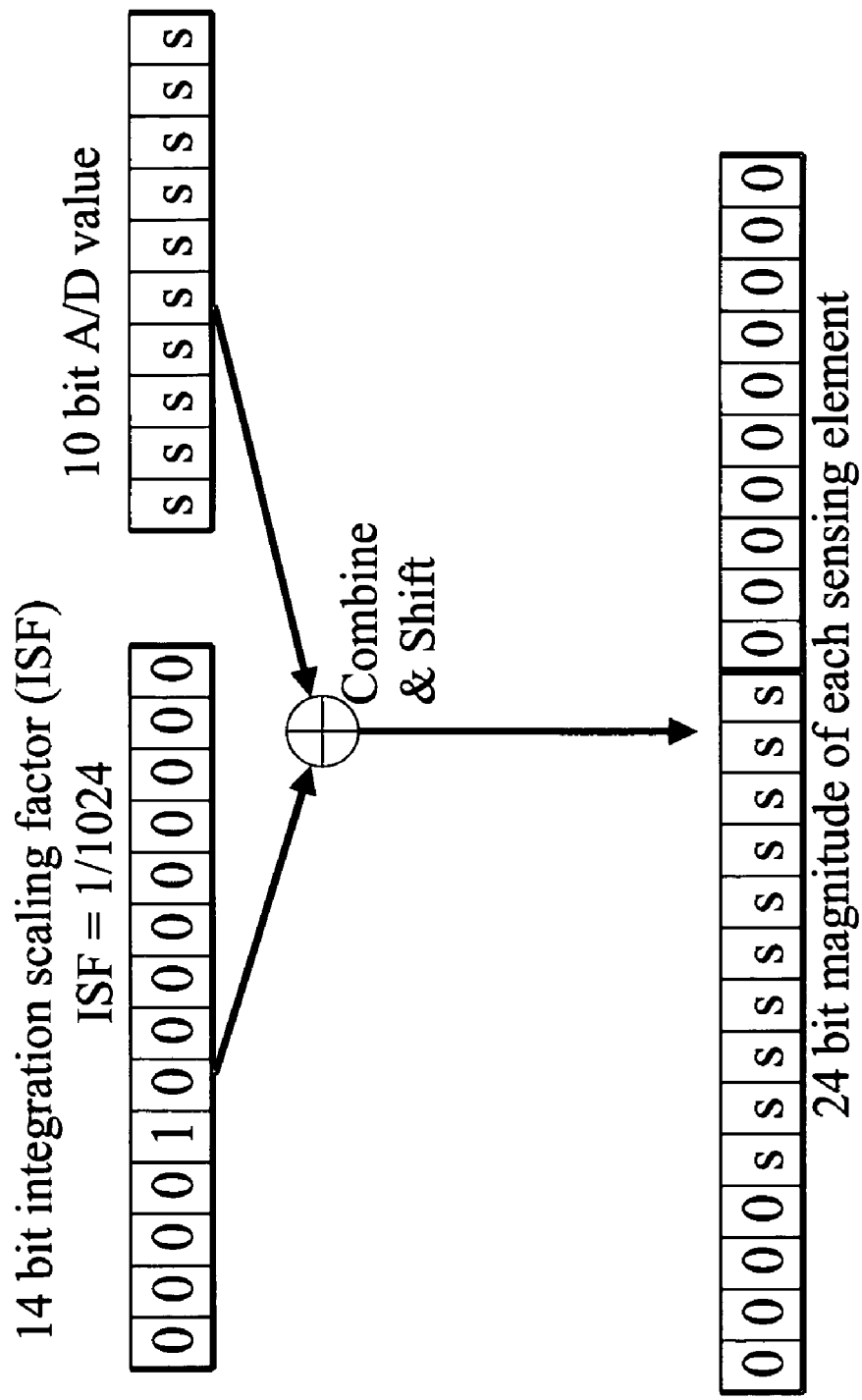
FIG. 8 is a schematic illustration showing the combining of a value of a 10 bit A/D converter and a 14 bit integration scaling factor (ISF) to form a 24 bit word to represent a magnitude of a pixel in a set of sensing elements and shifting the 24 bit word to left 10 bits, where $ISF=\frac{1}{1024}$.

Referring to FIG. 8, a schematic diagram of combining 14 bit integration scaling factor (ISF) and 10 bit digital value from an A/D converter to form a 24 bit data word, where ISF=1/1024, is illustrated. When ISF=1/1024, the 14 bit integration scaling factor is filled with zeros except that the tenth least significant bit is filled with one. The resulting magnitude is a 24 bit data word with the leading 4 bit most significant bits filled with zeros, the 10 least significant bit filled with zeros, and the 10 bits in the middle filled with 10 bit digital value from the A/D converter.

In an alternate embodiment, the prescaling factor and combination function employs a ratiometric mathematical function to extend the dynamic range resolution of the sensor data word. This embodiment also has the ability of providing for increased or decreased integration times depending on the digital values from the A/D converter 16. A similar analysis of the A/D values from sensing elements 14 may be performed by processor 18 to set the integration time for the next frame acquisition. The same process may be applied to an alternate embodiment wherein the prescaling factor and combination function employs a nonlinear mathematical function to extend the dynamic range resolution of the sensor data word.

As described above, integration times adapted to sets of pixels (i.e. cluster-specific integration times) will be updated at the frame rate of the sensor. In the case of night vision systems, there is a need for a relatively high frame rate to provide fairly natural vision to soldiers who may be driving or flying with the vision systems as their only situation view. The high frame rate is a benefit in this case, by providing faster integration time updates. The significant benefit of the high dynamic range system is the very wide range of light intensities that it can handle within a single scene. As an example, a 14-bit prescaler coupled with a 10-bit A/D converter could provide an effective 24 bit resolution. The proviso, of course, is that there is only a 10 bit dynamic range within any given set of pixels, so certain high contrast artifacts might not be completely captured. The present invention can be directed toward making more sets of pixels of smaller size by having a single processor 18 controlling integration times for multiple "sub-sets" or "sub-clusters" of pixels with selectable integration times for each sub-cluster to enable finer-grained prescaling.

Thus, the high dynamic range sensor may be deemed an "adaptive pre-scaler for an A/D converter." The prescaler is the duty factor control, which scales the integration times in fractional amounts, preferably providing by $1/2^N$ amounts for binary integer samples. The adaptive part is the computer process whereby the magnitudes of the samples from each set of pixels are analyzed and a new integration duty factor is generated for the next frame acquisition. The adaptation process may require a series of sequential frames to reach the "best" integration times depending on the scene conditions, but the effective range of scene conditions that can be captured is significantly improved over previous approaches.

This adaptation time can be decreased by selecting a shorter integration time (one less likely to saturate in bright conditions) for the first sample, and if the majority of the samples are well less than 50% (i.e., for example <6.25%=1/16) the integration time adjustment could be made more than a 2× factor (16×=4 bit positions in this case).

As noted above, although the present invention is particularly advantageous with respect to digital night vision, the concepts described herein may be applied to other types of applications where there is an array of sensors that may be subject to high dynamic range conditions over the extent of the sensing array. For example, other types of sensors may have a nonlinear response that requires an integration scaling factor selected to match the sensor response characteristics. Certain sensors may have non-constant response characteristics requiring a continuously changing and adaptable integration scaling factor function.

Other embodiments and configurations may be devised without departing from the spirit of the invention and the scope of the appended claims.

The invention claimed is:

1. A high dynamic range sensor assembly, comprising:
   a plurality of sensing sets, said sensing sets being organized into a sensing array, each of said sensing sets comprising:
   a) a set of sensing elements for sensing physical phenomena, said set of sensing elements having a locally selectable integration time;
   b) an analog-to-digital (A/D) converter operatively connected to said set of sensing elements for acquisition and conversion of an analog signal from each of said sensing elements into a digital signal; and,
   c) a processor operatively connected to said A/D converter and to said set of sensing elements for managing said selectable integration time for said set of sensing elements and for analyzing said digital signals from each of said sensing elements in said set of sensing elements, wherein said digital signals from each of said sensing elements are measured by said processor and an integration scaling factor for said set of sensing elements is computed and controlled by said processor to adjust said integration time.

2. The high dynamic range sensor assembly of claim 1, wherein said integration scaling factor for said set of sensing elements is mathematically combined with a value of said digital signal from said A/D converter to form a larger data word than what is generated by said A/D converter, said larger data word being utilized to represent a magnitude of each of said sensing elements.

3. The high dynamic range sensor assembly of claim 2, wherein said integration scaling factor for said set of sensing elements is a mathematical function of form J/I.

4. The high dynamic range sensor assembly of claim 2, wherein said integration scaling factor for said set of sensing elements is the reciprocal of a nonlinear mathematical function.

5. The high dynamic range sensor assembly of claim 2, wherein said integration scaling factor for said set of sensing elements is selected from a data set $\{1/2^{(N-1)}, \ldots 1/8, 1/4, 1/2, 1\}$, said data set containing N items, where N is an integer and N>=1.

6. The high dynamic range sensor assembly of claim 5, wherein the magnitude of said digital signals from each of said sensing elements has a resolution of K bits, where K=N+M, N is the total number of different integration scaling factors and M is the number of bits of resolution of said A/D converter, and initially said magnitude being set by an estimated integration scaling factor with the trailing L bits and the leading (N-L) bits of said magnitude being set to zero, said estimated integration scaling factor being $1/2^L$, where L is an integer and L is not more than N.

7. The high dynamic range sensor assembly of claim 6, wherein K is at least 20 bits.

8. The high dynamic range sensor of claim 1, wherein said integration scaling factor for said set of sensing elements is computed by said processor by analyzing said digital signal from said A/D converter, wherein if a substantial number of A/D values have saturated, said integration time is decreased; and, wherein if a substantial number of A/D values are below a predetermined threshold, said integration time is increased.

9. The high dynamic range sensor of claim 8, wherein, as said processor reads out said digital signal of said A/D converter for each pixel in said set of sensing elements, if the number of said digital signals that is at the full scale range (FSR) exceeds a predefined threshold, said processor decreases said selectable integration time and effectively doubles said output value of said A/D converter by shifting said (N+M) bits magnitude value to left by one bit and rightmost bit will be filled with zero.

10. The high dynamic range sensor of claim 8, wherein, as said processor reads out said digital signal of said A/D converter for each pixel in said set of sensing elements, if the number of said digital signals that is well below a predefined value exceeds a predefined threshold, said processor increases said selectable integration time and effectively decreases said output value of said A/D converter by half by shifting said (N+M) bits magnitude value to right by one bit and leftmost bit will be filled with zero.

11. The high dynamic range sensor of claim 8, wherein said predefined threshold is one half of the full scale range (FSR) of said A/D converter.

12. The high dynamic range sensor of claim 1, wherein said sensing array is an optical focal plane array image sensor.

13. The high dynamic range sensor of claim 12, wherein said optical focal plane array image sensor is capable of night vision sensing.

14. The high dynamic range sensor assembly of claim 1, wherein each of said sensing elements, comprises:
  a) a sensor sensing physical phenomena and generating an electrical signal;
  b) a storage element storing said electrical signal;
  c) a reset switch resetting said storage element to an initial state having no signal;
  d) a sample switch moving said electrical signal from said sensor to said storage element; and,
  e) an analog interface operatively connected to said sample switch, said storage element, and said A/D converter, said A/D converter being shared with each of said sensing elements in said sensing sets,
wherein, said reset switch, said sample switch and said analog interface are controlled by said processor.

15. The high dynamic range sensor assembly of claim 1, wherein said processor comprises a dedicated processor executing a sequence of stored program instructions.

16. The high dynamic range sensor assembly of claim 15, wherein said processors of said sensing sets are interconnected to communicate image information with each other.

17. The high dynamic range sensor assembly of claim 16, wherein said interconnected processors perform image processing functions.

18. A high dynamic range night vision sensor assembly, comprising:
  a plurality of pixel sets, said pixel sets being organized into an array, each of said pixel sets comprising:
    a) a focal plane array comprising a set of pixel elements having a locally selectable integration time;
    b) an analog-to-digital (A/D) converter operatively connected to said focal plane array for acquisition and conversion of an analog signal from each of said pixel elements into a digital signal; and,
    c) a dedicated processor operatively connected to said A/D converter and to said focal plane array for managing said selectable integration time for said set of sensing elements and for analyzing said digital signals from each of said pixel elements in said focal plane array, wherein said digital signals from each of said pixel elements is measured by said processor and an integration scaling factor for said focal plane array is computed and controlled by said processor to adjust said integration time.

19. The high dynamic range night vision sensor assembly of claim 18, wherein a light intensity value for each of sensing pixel in said focal plane array is represented by a data word mathematically combining said integration scaling factor for said set of sensing elements and a value of said digital signal from said A/D converter, the resolution of said light intensity value for each pixel in said focal plane array being (N+M) bits, where N is the total number of integration scaling factors and M is the bits of resolution of said A/D converter.

20. The high dynamic range night vision sensor assembly of claim 18, wherein as said processor reads out said output of A/D converter for each pixel element in said focal panel array, if the number of said output that is at FSR exceeds a predefined threshold, said processor decreases said selectable integration time by approximately one-half and effectively doubles said output value of said A/D converter by shifting said (N+M) bits light intensity value to left by one bit and rightmost bit will be filled with zero decreasing said integration scaling factor by approximately one-half.

21. The high dynamic range night vision sensor assembly of claim 18, wherein as said processor reads out said output of A/D converter for each pixel element in said focal panel array, if the number of said output that is well below a predefined value exceeds a predefined threshold, said processor increases said selectable integration time and effectively decreases said output value of said A/D converter by half by shifting said (N+M) bits light intensity value to right by one bit and leftmost bit will be filled with zero, said integration scaling factor being approximately doubled.

22. A method for providing high dynamic range sensing, comprising the steps of:

providing a plurality of sensing sets, said sensing sets being organized into a sensing array, each of said sensing sets operating by utilizing the following steps:
  a) sensing a selected physical phenomena using a set of sensing elements having a locally selectable integration time;
  b) acquiring and converting an analog signal from each of said sensing elements into a digital signal using an analog-to-digital (A/D) converter operatively connected to said set of sensing elements; and,
  c) managing said selectable integration time for said set of sensing elements and analyzing said digital signals from each of said sensing elements in said set of sensing elements, utilizing a processor operatively connected to said A/D converter and to said set of sensing elements, wherein said digital signals from each of said sensing elements are measured by said processor and an integration scaling factor for said set of sensing elements is computed and controlled by said processor to adjust said integration time.

23. The method of claim 22, wherein said step of managing said selectable integration time for said set of sensing elements and analyzing said digital signals from each of said sensing elements in said set of sensing elements, comprises the step of mathematically combining said integration scaling factor for said set of sensing elements with a value of said digital signal from said A/D converter and forming a larger data word than what is generated by said A/D converter, said larger data word being utilized to represent a magnitude of each of said sensing elements.

24. The method of claim 22, wherein said step of managing said selectable integration time for said set of sensing elements and analyzing said digital signals from each of said sensing elements in said set of sensing elements, comprises the step of decreasing said integration time if a substantial number of A/D values have saturated, and increasing said integration time if a substantial number of A/D values are below a predetermined threshold.

25. The method of claim 22, wherein said step of managing said selectable integration time for said set of sensing elements and analyzing said digital signals from each of said sensing elements in said set of sensing elements, comprises the step of reading out said digital signal of said A/D converter for each pixel in said set of sensing elements utilizing said processor, if the number of said digital signals that is at the full scale range (FSR) exceeds a predefined threshold, said processor decreases said selectable integration time and effectively doubles said output value of said A/D converter by shifting said (N+M) bits magnitude value to left by one bit and rightmost bit will be filled with zero.

26. The method of claim 22, wherein said step of managing said selectable integration time for said set of sensing elements and analyzing said digital signals from each of said sensing elements in said set of sensing elements, comprises the step of reading out said digital signal of said A/D converter for each pixel in said set of sensing elements utilizing said processor, if the number of said digital signals that is well below a predefined value (i.e. FSR/2) exceeds a predefined threshold, said processor increases said selectable integration time and effectively decreases said output value of said A/D converter by half by shifting said (N+M) bits magnitude value to right by one bit and leftmost bit will be filled with zero.

27. The method of claim 22, wherein said step of sensing a selected physical phenomena using a set of sensing elements having a locally selectable integration time, comprises the following steps:
  a) sensing physical phenomena and generating an electrical signal utilizing a sensor;
  b) storing said electrical signal utilizing a storage element;
  c) resetting said storage element to an initial state having no signal utilizing a reset switch;
  d) moving said electrical signal from said sensor to said storage element utilizing a sample switch; and,
  e) acquiring and converting said electrical signal into a digital signal utilizing an analog interface operatively connected to said sample switch, said storage element, and said A/D converter, said A/D converter being shared with each of said sensing elements in said sensing sets, wherein, said reset switch, said sample switch and said analog interface are controlled by said processor.

* * * * *